US009630576B1

(12) United States Patent
Stebbins et al.

(10) Patent No.: US 9,630,576 B1
(45) Date of Patent: Apr. 25, 2017

(54) PANEL ASSEMBLY WITH NOISE ATTENUATION SYSTEM HAVING A GEOMETRIC PATTERN FOR AIR GAP ACOUSTIC IMPEDANCE

(71) Applicant: GM GLOBAL TECHNOLOGY OPERATIONS LLC, Detroit, MI (US)

(72) Inventors: Mark A. Stebbins, Bloomfield Hills, MI (US); Qijun Zhang, Canton, MI (US); Joseph A. Schudt, Macomb, MI (US); Andrew J. Baines, Novi, MI (US); John E. Howard, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/960,628

(22) Filed: Dec. 7, 2015

(51) Int. Cl.
*B60R 13/08* (2006.01)
(52) U.S. Cl.
CPC ................ *B60R 13/0815* (2013.01)
(58) Field of Classification Search
CPC .... B60R 13/02; B60R 13/0815; B60R 13/083
USPC ........................ 181/290, 291, 293
See application file for complete search history.

(56) References Cited

U.S. PATENT DOCUMENTS

| | | | | |
|---|---|---|---|---|
| 4,430,286 A * | 2/1984 | Franz ....................... | B27N 3/00 264/230 |
| 4,539,252 A * | 9/1985 | Franz ....................... | B27N 3/00 181/198 |
| 4,741,945 A * | 5/1988 | Brant ....................... | B32B 5/18 296/211 |
| 4,886,696 A * | 12/1989 | Bainbridge ........... | B31F 1/0009 181/284 |
| 5,057,176 A * | 10/1991 | Bainbridge ........... | B31F 1/0009 156/222 |
| 5,483,028 A * | 1/1996 | Holwerda ............... | B60R 13/08 181/207 |
| 5,509,247 A * | 4/1996 | Fortez ................. | B60R 13/0225 181/284 |
| 5,660,908 A * | 8/1997 | Kelman ................... | B32B 3/26 156/244.25 |
| 5,744,763 A * | 4/1998 | Iwasa ..................... | B29C 43/203 181/286 |
| 5,892,187 A * | 4/1999 | Patrick ................ | B60R 13/0225 181/286 |
| 5,959,264 A * | 9/1999 | Bruck ..................... | B60R 13/08 181/286 |

(Continued)

*Primary Examiner* — Jeremy Luks
(74) *Attorney, Agent, or Firm* — Quinn IP Law

(57) ABSTRACT

A panel assembly includes a first panel and noise attenuation panel that is attached to the first panel. The noise attenuation panel includes a central portion having a length and a width. The central portion of the noise attenuation panel is spaced from the surface of the first panel by a gap distance to form a gas chamber between the surface of the first panel and the central portion of the noise attenuation panel. The panel assembly includes at least one wall structure that is disposed within the gas chamber. The wall structure extends between the central portion of the noise attenuation panel and the surface of the first panel, and includes a pattern that defines a fluid flow path through the gas chamber, which includes an effective length that is greater than both the length and the width of the central portion of the noise attenuation panel.

19 Claims, 3 Drawing Sheets

(56) References Cited

U.S. PATENT DOCUMENTS

| | | | | |
|---|---|---|---|---|
| 6,290,022 B1* | 9/2001 | Wolf | ............... | G10K 11/172 |
| | | | | 181/286 |
| 6,547,301 B1* | 4/2003 | Keller | ............... | B60H 1/0055 |
| | | | | 165/42 |
| 6,586,072 B1* | 7/2003 | Renault | ............... | B32B 3/12 |
| | | | | 156/71 |
| 6,951,264 B2* | 10/2005 | Byma | ............... | B60R 13/0815 |
| | | | | 181/286 |
| 7,182,172 B2* | 2/2007 | Albin, Jr. | ............... | B32B 3/30 |
| | | | | 181/204 |
| 8,931,592 B2* | 1/2015 | Savian | ............... | B64C 1/066 |
| | | | | 181/210 |
| 2005/0040679 A1* | 2/2005 | Lipke | ............... | B32B 3/28 |
| | | | | 296/214 |
| 2005/0263346 A1* | 12/2005 | Nishimura | ............... | E04B 1/86 |
| | | | | 181/290 |
| 2006/0169531 A1* | 8/2006 | Volker | ............... | G10K 11/172 |
| | | | | 181/204 |
| 2007/0122594 A1* | 5/2007 | Kosar | ............... | B60R 13/083 |
| | | | | 428/174 |
| 2008/0099278 A1* | 5/2008 | Simon | ............... | B32B 3/28 |
| | | | | 181/293 |

* cited by examiner

PANEL ASSEMBLY WITH NOISE ATTENUATION SYSTEM HAVING A GEOMETRIC PATTERN FOR AIR GAP ACOUSTIC IMPEDANCE

TECHNICAL FIELD

The disclosure generally relates to a panel assembly, and more specifically to a body panel assembly for a body of a vehicle for attenuating cabin noise.

BACKGROUND

Minor movement of panels can generate and/or perpetuate noise. In instances where panels form a cabin area, such as the exterior body panels of a vehicle, any noise caused or transferred by the movement of the panels may travel into the cabin area, and negatively affect the driving experience of the passengers within the cabin area. It is therefore desirable to attenuate the noise generated or transferred by the body panels, to improve the driving experience of the passengers.

SUMMARY

A panel assembly for a vehicle is provided. The panel assembly includes a first panel that defines a surface, and extends along a long axis. A noise attenuation panel includes a circumferential edge and a central portion. The central portion includes a length along the long axis of the first panel, and a width perpendicular to the long axis of the first panel. The noise attenuation panel is attached to the surface of the first panel along the circumferential edge of the noise attenuation panel. The central portion of the noise attenuation panel is spaced from the surface of the first panel by a gap distance to form a gas chamber between the surface of the first panel and the central portion of the noise attenuation panel. The panel assembly includes at least one wall structure that is disposed within the gas chamber. The wall structure extends between the central portion of the noise attenuation panel and the surface of the first panel. The wall structure includes a pattern that defines a fluid flow path through the gas chamber, which includes an effective length that is greater than both the length and the width of the central portion of the noise attenuation panel.

A vehicle is also provided. The vehicle includes a roof panel that extends along a long axis, and defines an exterior body surface and an interior surface. A noise attenuation panel includes a circumferential edge and a central portion. The central portion includes a length along the long axis of the roof panel, and a width perpendicular to the long axis of the roof panel. A trim panel is disposed adjacent the noise attenuation panel, with the noise attenuation panel disposed between the trim panel and the roof panel. The noise attenuation panel is attached to the interior surface of the roof panel, along the circumferential edge of the noise attenuation panel. The central portion of the noise attenuation panel is spaced from the interior surface of the roof panel by a gap distance to form a gas chamber between the interior surface of the roof panel and the central portion of the noise attenuation panel. At least one wall structure is disposed within the gas chamber, and extends between the central portion of the noise attenuation panel and the interior surface of the roof panel. The wall structure includes a pattern that defines a fluid flow path through the gas chamber having an effective length that is greater than both the length and the width of the central portion of the noise attenuation panel.

Accordingly, as the first panel, e.g., the roof panel, moves in a wave-like motion, a portion of the first panel adjacent the gas chamber will raise toward the central portion of the noise attenuation panel, thereby causing the gas within the gas chamber to rush or move within the gas chamber. Due to the large ratio between the area of the central portion of the noise attenuation panel and the gap distance, a small movement of the first panel causes a large movement of the gas laterally across the gas chamber. The movement of the gas across the gas chamber increases the effective acoustic mass of the noise attenuation panel, as well as damping the movement of the first panel, thereby attenuating the propagation of noise from the first panel. The wall structure in the gas chamber, between the noise attenuation chamber and the first panel, maximizes the impedance of the gas chamber. By creating or forming the fluid flow path for the gas in the gas chamber to follow, the performance of the noise attenuation panel may be tuned and/or optimized to minimize the dynamic response of the first panel.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is generally shown at 20. The vehicle 20 is equipped with a panel assembly 22, which is configured to attenuate noise within a cabin 24 of the vehicle 20. The vehicle 20 is shown in the exemplary embodiment as an automobile. However, it should be appreciated that the vehicle 20 may include any other type and/or configuration of vehicle 20, such as an airplane, a boat, train, tractor, etc. Furthermore, it should be appreciated that the panel assembly 22 may be incorporated into a system other than a vehicle 20, and that the panel assembly 22 does not have to be part of a vehicle 20, such as the exemplary embodiment shown in the Figures.

Figure 1:
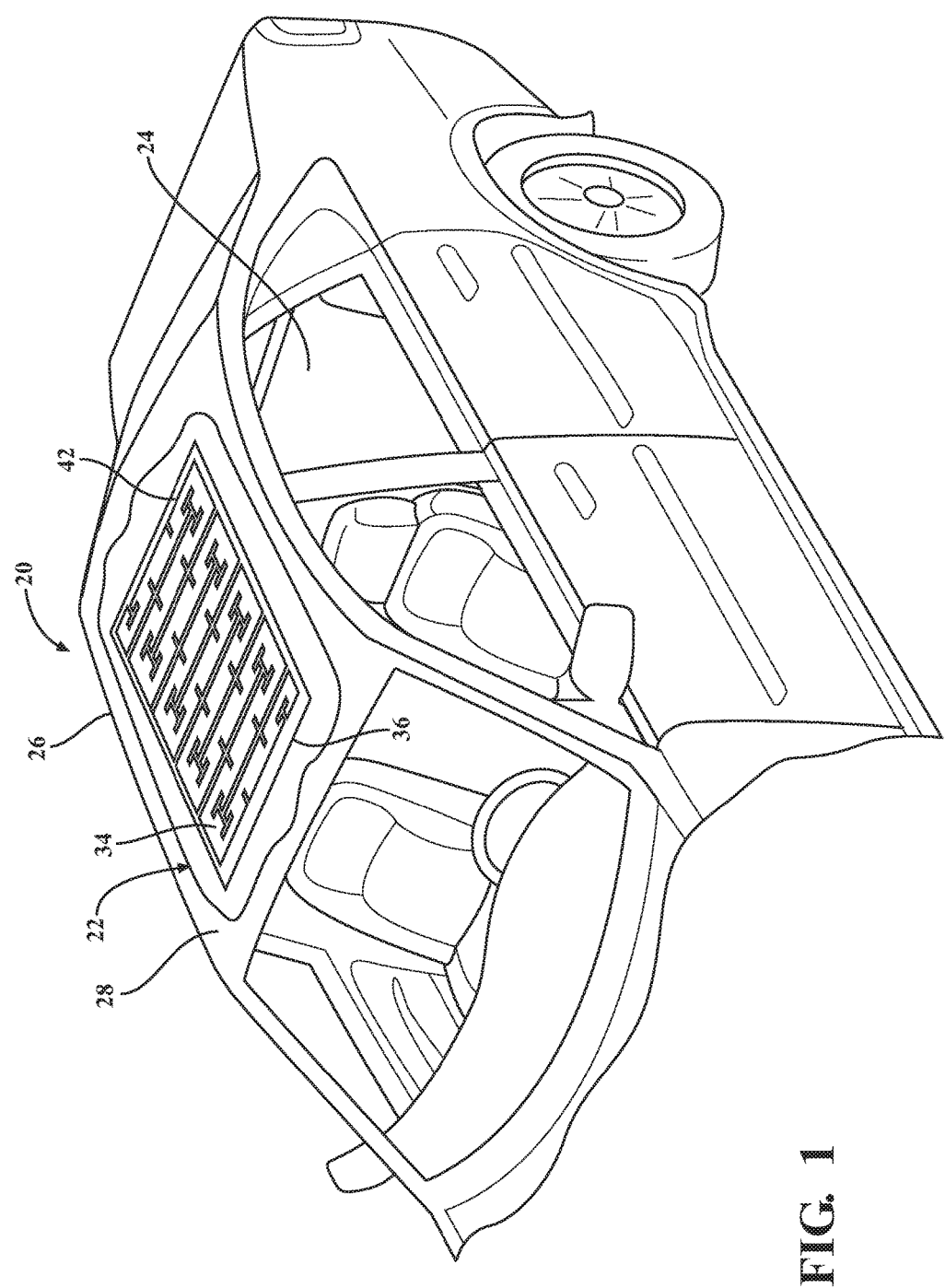
FIG. 1 is a schematic perspective view of a vehicle.

Referring to FIG. 1, the vehicle 20 includes a body 26 that includes several panels, such as a roof panel 28. While the panel assembly 22 may be defined or configured as any panel of the body 26 of the vehicle 20, the panel assembly 22 is specifically shown and discussed herein with reference to the roof panel 28 shown in the Figures. However, it should be appreciated that the panel assembly 22 is not limited to applications associated with the roof panel 28, and may be configured for any other panel of the body 26.

Figure 2:
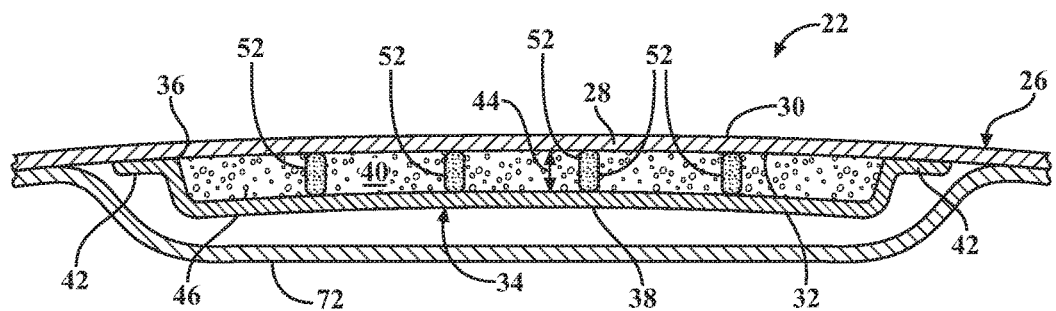
FIG. 2 is a schematic cross sectional view of the vehicle.

The roof panel 28 is hereinafter referred to as the first panel 28 of the panel assembly 22. Referring to FIGS. 1 and 2, the first panel 28 includes an exterior surface 30 which defines an exterior of the body 26, and an interior surface 32 disposed opposite the exterior surface 30. The first panel 28 may be manufactured from any material suitable for the specific use of the panel assembly 22. For example, in the exemplary embodiment shown in the Figures as an automobile, the first panel 28 may include and be manufactured from a metal material, such as steel or aluminum. However, in other applications, the first panel 28 of the panel assembly 22 may include and be manufactured from some other material, such as plastic, fiberglass, or carbon fiber reinforced polymer.

The panel assembly 22 includes a noise attenuation panel 34 that is attached to the first panel 28. As shown in the Figures, the noise attenuation panel 34 is disposed adjacent and attached to the interior surface 32 of the first panel 28. However, the noise attenuation panel 34 may alternatively be disposed adjacent and attached to the exterior surface 30 of the first panel 28. The noise attenuation panel 34 defines a circumferential edge 36 extending around a perimeter of the noise attenuation panel 34. The noise attenuation panel 34 may include any plan shape suitable for the specific shape and/or configuration of the first panel 28, and as such, the circumferential edge 36 of the noise attenuation panel 34 may include any shape corresponding to the shape of the noise attenuation panel 34. For example, the noise attenuation panel 34 may include a shape that is round, oval, rectangular, polygonal, etc. As shown in the exemplary embodiment in FIG. 1, the noise attenuation panel 34 is substantially rectangular shaped. However, it should be appreciated that the shape of the noise attenuation panel 34 shown in FIG. 1 is only exemplary, and the shape of the noise attenuation panel 34 may vary from the exemplary embodiment shown and described herein.

As noted above, the noise attenuation panel 34 includes the circumferential edge 36 which extends around the outer perimeter of the noise attenuation panel 34. The circumferential edge 36 surrounds and is disposed about a central portion 38 of the noise attenuation panel 34. As shown in FIG. 2, the circumferential edge 36 is vertically spaced from the central portion 38. Accordingly, as viewed in FIG. 2, it should be appreciated that the central portion 38 is lowered from the circumferential edge 36, relative to the interior surface 32 of the first panel 28, to form a gas chamber 40 between the interior surface 32 of the first panel 28 and the central portion 38 of the noise attenuation panel 34, described in greater detail below.

The noise attenuation panel 34 may include and be manufactured from a semi-rigid material. The material used to form and/or construct the noise attenuation panel 34 must be capable of maintaining an initial shape over time, and should capable of insulating against noise transmission, and/or capable of absorbing noise. Preferably, the noise attenuation panel 34 includes and is manufactured from a non-metal material. More preferably, the noise attenuation panel 34 includes and is manufactured from a fiber reinforced cardboard material. However, it should be appreciated that the noise attenuation panel 34 may be manufactured from some other material capable of performing the functions of the noise attenuation panel 34 as described herein.

As shown, the noise attenuation panel 34 is attached to the interior surface 32 of the first panel 28, along the circumferential edge 36 of the noise attenuation panel 34. The circumferential edge 36 of the noise attenuation panel 34 may be attached to the first panel 28 in any suitable manner. For example, the noise attenuation panel 34 may be bonded or glued to the first panel 28 with an adhesive, taped to the first panel 28 with an adhesive tape, attached via a plurality of fasteners, or in any other suitable manner. The circumferential edge 36 may include a lip or flange 42 disposed adjacent the interior surface 32 of the first panel 28 to facilitate the attachment of the noise attenuation panel 34 to the first panel 28. The noise attenuation panel 34 is continuously attached to the first panel 28, around the entire circumferential edge 36 of the noise attenuation panel 34, to completely seal the gas chamber 40 and prevent the escape of the gas from the gas chamber 40, between the circumferential edge 36 of the noise attenuation panel 34 and the surface of the first panel 28.

Figure 3:
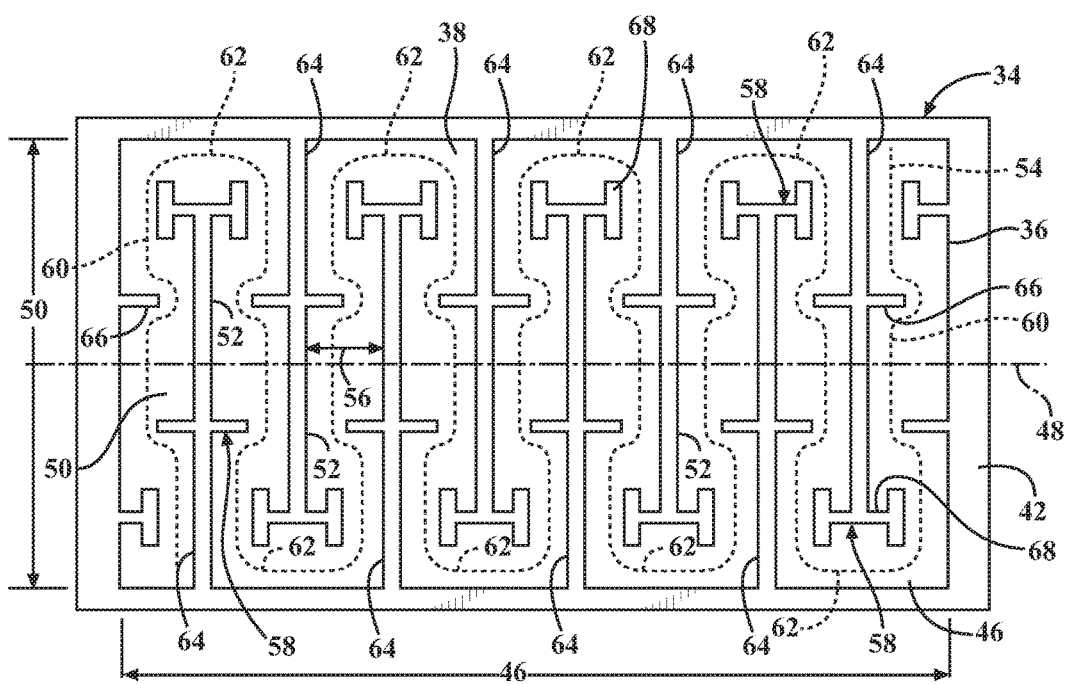
FIG. 3 is a schematic plan view of a noise attenuation panel of a panel assembly showing a first embodiment of a wall structure.
Figure 4:
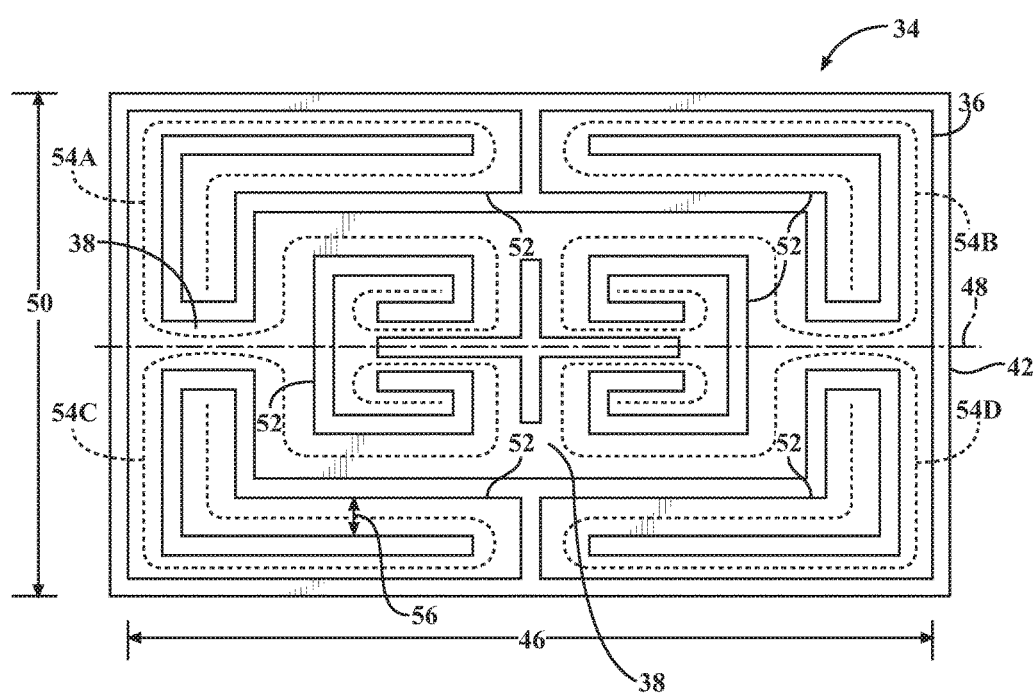
FIG. 4 is a schematic plan view of the noise attenuation panel showing a second embodiment of the wall structure.

As noted above, the central portion 38 of the noise attenuation panel 34 is spaced from the interior surface 32 of the first panel 28 to define the gas chamber 40 between the interior surface 32 of the first panel 28 and the central portion 38 of the noise attenuation panel 34. The central portion 38 of the noise attenuation panel 34 is spaced from the interior surface 32 of the first panel 28 a gap distance 44 to form the gas chamber 40. Referring to FIGS. 3 and 4, the central portion 38 of the noise attenuation panel 34 includes a length 46 along a long axis 48 of the first panel 28, and a width 50 perpendicular to the long axis 48 of the first panel 28. The long axis 48 of the first panel 28 may be defined as the axis extending along the longest dimension of the first panel 28. For example, the long axis 48 of the roof panel 28 may be considered a central longitudinal axis of the vehicle 20. The gap distance 44 may be substantially consistent across the central portion 38 of the noise attenuation panel 34. Alternatively, the gap distance 44 may vary across the central portion 38 of the noise attenuation panel 34. Preferably, the gap distance 44 is between the range of 1.5 mm and 5.0 mm. However, the gap distance 44 may vary from the exemplary range described herein.

Referring to FIGS. 2 through 4, the panel assembly 22 includes at least one wall structure 52 that is disposed within the gas chamber 40. The wall structure 52 may include one, single continuous wall structure 52, or may alternatively include multiple, independent wall structures 52 that cooperate together to form a pattern, such as shown in FIGS. 3 and 4. The wall structures 52 extend between the central portion 38 of the noise attenuation panel 34, and the surface of the first panel 28, and include or are arranged to define a geometric pattern. The pattern of the wall structures 52 defines the shape of a tortuous fluid flow path 54 through the gas chamber 40. The fluid flow path 54 includes an effective length 46 that is greater than both the length 46 and the width 50 of the central portion 38 of the noise attenuation panel 34. As used herein, the term "effective length 46" is defined as a total length 46 of the fluid flow path 54. The fluid flow path 54 may include a single path, such as shown in FIG. 3, or may include multiple paths, such as shown in FIG. 4. Preferably, the fluid flow path 54 includes a path width 56 that is between one eighth and one tenth of the length 46 of the central portion 38. However, the path width 56 may differ from the exemplary range described herein.

The wall structures 52 may be formed in any suitable manner. For example, the wall structures 52 may be formed from an adhesive, having a thickness equal to the gap distance 44. For example, a bead of a suitable adhesive may be applied to the noise attenuation panel 34 to form the desired pattern of the wall structures 52, and then the noise attenuation panel 34 may be positioned against the surface of the first panel 28 so that the adhesive spans the gap distance 44 between the noise attenuation panel 34 and the first panel 28. The adhesive may include any adhesive suitable for bonding the material of the noise attenuation panel 34 to the first panel 28. Alternatively, the wall structures 52 may include one or two sided foam tape that is attached to either the noise attenuation panel 34 or the first panel 28. Accordingly, it should be appreciated that the wall structure 52 is bonded to at least one of the noise attenuation panel 34 and the first panel 28, but is preferably bonded to both the noise attenuation panel 34 and the first panel 28. By bonding the wall structures 52 to both the first panel 28 and the noise attenuation panel 34, dynamic forces from the first panel 28 may be transferred to the noise attenuation panel 34.

The wall structures 52 may include at least one, and preferably a plurality of fluid flow control features 58. Each of the fluid flow control features 58 extend from the wall structure 52 into the fluid flow path 54 defined by the wall structure 52. The fluid flow control features 58 affect the flow of a gas through the fluid flow path 54, and help to optimize noise attenuation, described in greater detail below.

Referring to FIG. 3, the pattern of the wall structures 52 defines the fluid flow path 54, which is generally shown by the dashed line at 54. The fluid flow path 54 of FIG. 3 includes a generally back and forth pattern having, a plurality of long segments 60 running generally parallel with the width 50 of the central portion 38, and a plurality of short segments 62 running generally parallel with the length 46 of the central portion 38. One of the short segments 62 of the fluid flow path 54 connects a pair of adjacent long segments 60 of the fluid flow path 54. Accordingly, the wall structures 52 include generally parallel linear wall segments 64, with each adjacent linear wall segment 64 extending inward from opposing lateral sides of the noise attenuation panel 34. The fluid flow control features 58 shown in the exemplary pattern of FIG. 3 include short wings 66 extending perpendicularly out from the linear wall segments 64, and "T" shaped features 68 at the end of each linear wall segment 64.

Referring to FIG. 4, the pattern of the wall structures 52 defines multiple fluid flow paths 54, which are generally shown by the dashed lines 54A, 54B, 54C, 54D. The fluid flow paths 54 of FIG. 4 generally extend from a respective quadrant of the central portion 38, and wind their way toward and merge at a general center of the central portion 38.

As shown in FIG. 2, the gas chamber 40 contains a gas. Preferably, the gas is air. However, other inert gases may be used instead. The gas within the gas chamber 40 is moveable within the gas chamber 40 in response to wave-like motion of the first panel 28. Movement of the gas within the gas chamber 40 increases the effective acoustic mass of the noise attenuation panel 34, which helps to dampen the wave-like motion of the first panel 28, and reduce noise generated from the wave-like motion of the first panel 28. Because of the large ratio of the pocket area to gap distance 44, a very small vertical movement of the first panel 28 causes or generates a large fluid movement of the gas through the fluid flow path 54. Moving the gas within the gas chamber 40, through the fluid flow path 54 requires energy, thereby absorbing energy from the first panel 28 as it moves in the wave-like motion, and thereby reducing the frequency and amplitude of the wave-like motion of the first panel 28. Reducing the frequency and the amplitude of the wave-like motion of the first panel 28, reduces the noise generated by or caused by the first panel 28 as a result of the wave-like motion, which may be transferred into the cabin 24 of the vehicle 20. Accordingly, the noise attenuation panel 34, and the gas contained within the gas chamber 40 between the noise attenuation panel 34 and the interior surface 32 of the first panel 28, operate to reduce noise within the cabin 24 of the vehicle 20. The fluid flow path 54 increases the distance that the gas in the gas chamber 40 may be moved, and controls the direction of movement. Accordingly, the geometric pattern of the wall structure 52 may be designed to specifically control the flow of the gas through the gas chamber 40 to optimize noise attenuation of the noise attenuation panel 34.

The fluid flow paths 54 shown in the Figures are merely exemplary, and it should be appreciated that the wall structures 52 may be positioned to define any number of possible fluid flow paths 54 through the gas chamber 40. The wall structures 52 may be specifically designed and/or arranged to optimize noise attenuation for a given vehicle 20 and/or panel, by changing the configuration or pattern of the wall structures 52. Different arrangement and/or pattern characteristics may be considered when designing the pattern of the wall structures 52, including but not limited to a ratio of the effective length 46 of the fluid flow channel to a diagonal length 46 of the central portion 38 of the noise attenuation panel 34, the interior angles of the fluid flow path 54, and/or the geometric pattern of the fluid flow path 54.

Referring to FIG. 2, the panel assembly 22 may further include a trim panel 72. The trim panel 72 is disposed adjacent the noise attenuation panel 34, such that the noise attenuation panel 34 is disposed between the trim panel 72 and the first panel 28. As shown in FIG. 2 and described with reference to the exemplary embodiment of a vehicle 20, the trim panel 72 may be referred to as a headliner of the vehicle 20. The trim panel 72 may be spaced from the noise attenuation panel 34 a separation distance. Accordingly, the trim panel 72 is attached to the first panel 28 in such a manner so as not to contact the noise attenuation panel 34, in order to not interfere with the operation of the noise attenuation panel 34 in attenuating noise from the first panel 28. Preferably, the separation distance is equal to or greater than 1.0 mm. However, it should be appreciated that the separation distance may differ from the exemplary distance described herein.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A panel assembly for a vehicle, the panel assembly comprising:
   a first panel defining a surface and extending along a long axis;
   a noise attenuation panel having a circumferential edge and a central portion, wherein the noise attenuation panel is attached to the surface of the first panel along the circumferential edge of the noise attenuation panel, and wherein the central portion includes a length along the long axis of the first panel, and a width perpendicular to the long axis of the first panel;

wherein the noise attenuation panel is continuously attached to the first panel in sealing engagement around the entire circumferential edge of the noise attenuation panel, to completely seal the gas chamber and prevent the escape of gases from the gas chamber between the circumferential edge of the noise attenuation panel and the surface of the first panel;

wherein the central portion of the noise attenuation panel is spaced from the surface of the first panel by a gap distance to form a gas chamber between the surface of the first panel and the central portion of the noise attenuation panel; and at least one wall structure disposed within the gas chamber and extending between the central portion of the noise attenuation panel and the surface of the first panel, wherein the at least one wall structure defines a pattern that forms a fluid flow path through the gas chamber having an effective length that is greater than both the length and the width of the central portion of the noise attenuation panel.

2. The panel assembly set forth in claim 1 wherein the at least one wall structure includes an adhesive.

3. The panel assembly set forth in claim 2 wherein the at least one wall structure is bonded to at least one of the surface of the first panel and the central portion of the noise attenuation panel.

4. The panel assembly set forth in claim 3 wherein the at least one wall structure is bonded to both the surface of the first panel and the central portion of the noise attenuation panel.

5. The panel assembly set forth in claim 1 wherein the at least one wall structure includes at least one fluid flow control feature extending into the fluid flow path for affecting a flow of a gas through the fluid flow path.

6. The panel assembly set forth in claim 1 wherein the fluid flow path includes a path width, and wherein the path width is between one eighth and one tenth of the length of the central portion.

7. The panel assembly set forth in claim 1 wherein the at least one wall structure includes a plurality of wall structures cooperating together to define the fluid flow path.

8. The panel assembly set forth in claim 1 wherein the fluid flow path includes only a single path.

9. The panel assembly set forth in claim 1 wherein the fluid flow path includes multiple paths.

10. The panel assembly set forth in claim 1 wherein the gap distance is between 1.5 mm and 5.0 mm.

11. The panel assembly set forth in claim 1 wherein the noise attenuation panel includes and is manufactured from a rigid, non-metal material.

12. The panel assembly set forth in claim 11 wherein the noise attenuation panel includes and is manufactured from a fiber reinforced cardboard material.

13. The panel assembly set forth in claim 1 wherein the first panel is an exterior body panel of a vehicle.

14. A panel assembly for a vehicle, the panel assembly comprising:

a first panel defining a surface and extending along a long axis;

a noise attenuation panel having a circumferential edge and a central portion, wherein the noise attenuation panel is attached to the surface of the first panel along the circumferential edge of the noise attenuation panel, and wherein the central portion includes a length along the long axis of the first panel, and a width perpendicular to the long axis of the first panel;

wherein the noise attenuation panel is continuously attached to the first panel in sealing engagement around the entire circumferential edge of the noise attenuation panel, to completely seal the gas chamber and prevent the escape of gases from the gas chamber between the circumferential edge of the noise attenuation panel and the surface of the first panel;

wherein the central portion of the noise attenuation panel is spaced from the surface of the first panel by a gap distance to form a gas chamber between the surface of the first panel and the central portion of the noise attenuation panel; and at least one wall structure disposed within the gas chamber and extending between the central portion of the noise attenuation panel and the surface of the first panel, wherein the at least one wall structure defines a pattern that forms a single fluid flow path through the gas chamber having an effective length that is greater than both the length and the width of the central portion of the noise attenuation panel;

wherein the pattern of the at least one wall structure defines the fluid flow path to include a generally back and forth pattern having a plurality of long segments running generally parallel with the width of the central portion, and a plurality of short segments running generally parallel with the length of the central portion, with one of the plurality of short segments of the fluid flow path connecting a pair of adjacent long segments of the fluid flow path; and wherein the fluid flow path includes a path width, and wherein the path width is between one eighth and one tenth of the length of the central portion.

15. A vehicle comprising:

a roof panel extending along a long axis, and defining an exterior body surface and an interior surface;

a noise attenuation panel having a circumferential edge and a central portion, wherein the noise attenuation panel is attached to the interior surface of the roof panel along the circumferential edge of the noise attenuation panel, and wherein the central portion includes a length along the long axis of the roof panel, and a width perpendicular to the long axis of the roof panel;

a trim panel disposed adjacent the noise attenuation panel, with the noise attenuation panel disposed between the trim panel and the roof panel;

wherein the central portion of the noise attenuation panel is spaced from the interior surface of the roof panel by a gap distance to form a gas chamber between the interior surface of the roof panel and the central portion of the noise attenuation panel;

wherein the noise attenuation panel is continuously attached to the roof panel in sealing engagement around the entire circumferential edge of the noise attenuation panel, to completely seal the gas chamber and prevent the escape of gases from the gas chamber between the circumferential edge of the noise attenuation panel and the surface of the roof panel; and at least one wall structure disposed within the gas chamber and extending between the central portion of the noise attenuation panel and the interior surface of the roof panel, wherein the at least one wall structure defines a pattern that forms only a single fluid flow path through the gas chamber having an effective length that is greater than both the length and the width of the central portion of the noise attenuation panel.

16. The vehicle set forth in claim 15 wherein the at least one wall structure includes an adhesive.

17. The vehicle set forth in claim 16 wherein the at least one wall structure is bonded to at least one of the interior surface of the roof panel and the central portion of the noise attenuation panel.

18. The vehicle set forth in claim 15 wherein the at least one wall structure includes at least one fluid flow control feature extending into the fluid flow path for affecting a flow of a gas through the fluid flow path.

19. The vehicle set forth in claim 15 wherein the fluid flow path includes a path width, and wherein the path width is between one eighth and one tenth of the length of the central portion.

* * * * *